United States Patent [19]

Standing

[11] Patent Number: 4,691,084
[45] Date of Patent: Sep. 1, 1987

[54] COMBINED ENERGISER AND REEL FOR ELECTRIC FENCES

[76] Inventor: Anthony C. Standing, 6 Buckland Pl., Cambridge, New Zealand

[21] Appl. No.: 905,680

[22] Filed: Sep. 9, 1986

Related U.S. Application Data

[63] Continuation of Ser. No. 639,355, Aug. 9, 1984, abandoned.

[51] Int. Cl.⁴ .......................... A01K 3/00; H05C 1/00
[52] U.S. Cl. ................................. 191/12.2 R; 256/10
[58] Field of Search ................... 191/12.2 R, 12.2 A, 191/12.4; 256/10

[56] References Cited

U.S. PATENT DOCUMENTS

| | | | |
|---|---|---|---|
| 2,274,330 | 2/1942 | Hammond | 191/12.2 R |
| 2,805,349 | 9/1957 | Friedman | 191/12.2 R |
| 2,860,197 | 11/1958 | Kost | 191/12.2 R |
| 2,885,610 | 5/1959 | Mueller | 256/10 X |
| 2,936,368 | 5/1960 | Andre | 191/12.2 R |
| 3,016,229 | 1/1962 | Jacobson | 256/10 |
| 3,258,545 | 6/1966 | Bernard, Jr. | 191/12.2 R |
| 3,387,825 | 6/1968 | Kreeger | 256/10 |
| 3,430,179 | 2/1969 | Shoji | 191/12.2 R |
| 3,590,171 | 6/1971 | Harrington | 191/12.2 R |
| 4,318,461 | 3/1982 | Brorein | 191/12.2 R |

Primary Examiner—Randolph A. Reese
Assistant Examiner—John G. Pido
Attorney, Agent, or Firm—Abelman, Frayne, Rezac & Schwab

[57] ABSTRACT

A reel for electric fence wire is formed from electrically insulative material and is supported for rotation between electrically conductive arms of a grounding stake, the reel containing an energizer which is grounded through an electrically conductive shaft which extends axially through one end of the reel to provide a journal bearing for the reel, the shaft being in electrical continuity with the associated arm of the grounding stake, and extending axially into engagement with a grounding electrode of the energizer, thus eliminating a requirement for slip rings.

6 Claims, 5 Drawing Figures

COMBINED ENERGISER AND REEL FOR ELECTRIC FENCES

This is a continuation of application Ser. No. 639,355, filed Aug. 9, 1984, now abandoned.

FIELD OF THE INVENTION

This invention relates to electric fences.

BACKGROUND OF THE INVENTION

One of the advantages of electric fencing systems is their portability. Because of this, such systems have found almost universal acceptance for the control of grazing animals. The typical electric fencing system will comprise an energiser, a power source for the energiser, electric fence wire (usually on a reel) and electrically insulated fence standards for supporting the wire from the ground. The power source, the energiser and the reel conventionally are separate units, which are interconnected each time an electric fence is erected.

SUMMARY OF THE INVENTION

It is an object of the present invention to provide a reel for the fence wire which embodies an energiser and also a battery unit for powering the energiser.

According to the present invention, there is provided a reel comprising a hub having a storage portion for electric fence wire, support means engagable with the reel and about which the reel may be rotated for the purpose of paying out or rewinding the electric fence wire, and an energiser and a battery located within the hub for supplying an electric charge to the electric fence wire. The energiser is grounded through a contact member which extends axially through one end of the reel and which is in electrical continuity with the energiser and with arms of a grounding stake between which the reel is journalled for rotation.

DESCRIPTION OF THE DRAWINGS

The invention will now be described with reference to the accompanying drawings in which.

DESCRIPTION OF THE PREFERRED EMBODIMENT

Figure 1:
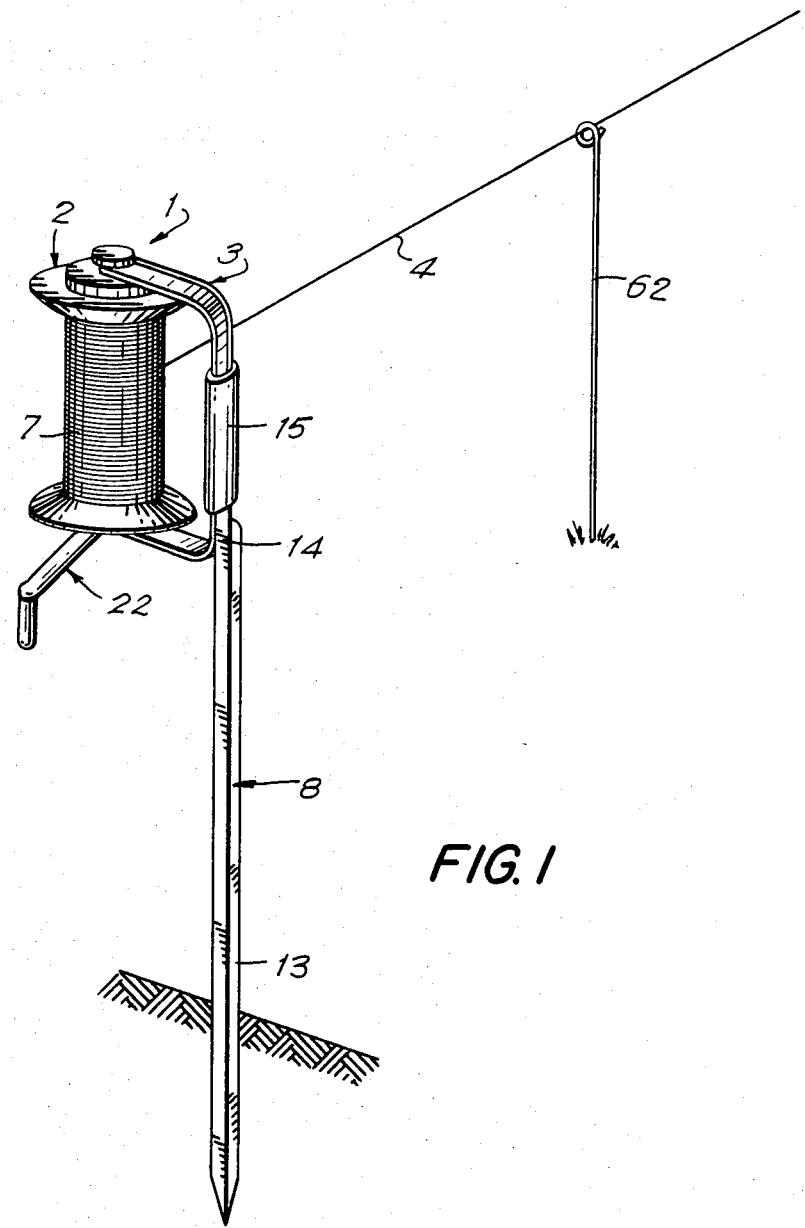
FIG. 1 is a perspective view of an electric fence system incorporating a reel in accordance with the present invention.

A reel in accordance with the present invention is indicated by arrow 1, and comprises a hub indicated by arrow 2. Arrow 3 indicates a support which permits rotation of the reel 1 for the purpose of paying out or reeling in an electric fence wire 4. The hub 2 provides an energiser locating region indicated by arrow 5, in which an electric fence energiser device 6 is housed. The energiser is adapted to supply electric current to the fence wire 4. A grounding member is indicated by arrow 8 for connecting the energiser device 6 to ground. A switch is indicated by arrow 9 for connecting the energiser to batteries 10 housed within a housing 11 of the energiser.

The support means 3 is a substantially U-shaped member having arms 12 between which the fence wire reel 1 is supported for rotation. The support means 3 in turn is supported by grounding stake 8. The stake 8 has a lower section 13 which is substantially L-shaped, and one limb 14 thereof extends upwardly into a handle 15 fast with the support means 3. The handle preferably is molded from an insulating material such as plastics or rubber. For ease of manufacture common limb 16 of the support means may be split at 17 this split being located within the handle 15.

The hub 2 is molded or fabricated in plastics, and is formed as a hollow cylinder 18 having end caps 19, 20. The cap 19 has a boss 21 which supports a winding handle 22. The boss 21 extends through an aperture 23 in the arm 12 and includes a peripheral shallow groove 24 within which is attached a complementary hub 25 of the handle 22. In the preferred form of the invention, the end cap 19, the boss 21, and the hub 25 of the handle are molded in plastics. In the event that the handle is subjected to a sudden impact, the hub 25 can break free from the boss 21 thus reducing the possibility of damage to either of those parts. The end of the cap 19 is reinforced by ribs 26.

The wire storage region 7 is defined by the central outer portion 27 of the cylinder 18 and by complementary peripheral flanges 28. The flanges 28 are inclined oppositely with respect to the central outer portion 27.

The end cap 20 of the hub 2 includes an end plate 29 supporting a boss 30. The hub 2 is rotatable relative to the support means 3 on an adjustable pivot and contact member generally indicated by arrow 31. The pivot and contact member 31 comprises an adjustment knob 32, and a contact pin 34 which extends axially through the boss 30.

The contact pin 34 includes a threaded portion 35 which is threaded into a complementary threaded bore 36 of a boss 33 of the adjustment knob 32. The remaining portion is unthreaded and extends through an aperture 38 in the arm 12 of the support means 3, and through an aperture 39 in the boss 30 of the end plate 29. The lower end of the pin 34 is fashioned into a point 40 and also mounts a lock washer 41. A friction washer 42 is positioned between the free arm 12 and the top side of the boss 30. The boss 33 is provided with a rim 43 so that the surface area of the boss 33 in contact with the arm 12 is minimal. The contact pin 34 is locked (not shown) in relation to the aperture 38, so that it does not rotate when the knob 32 is tightened. To lock the pin 34 in relation to aperture 38, the aperture and the pin may be provided with co-acting flats. The knob 32 can be tightened or loosened to adjust the pressure on the friction washer 42 and thus control the freedom of rotation of the hub 2 with respect to the support means 3. The hub can be frictionally locked by tightening down the knob 32, or frictionally restrained during paying out of the wire, or, free from frictional restraint as is desirable during reeling in of the wire.

Figure 3:
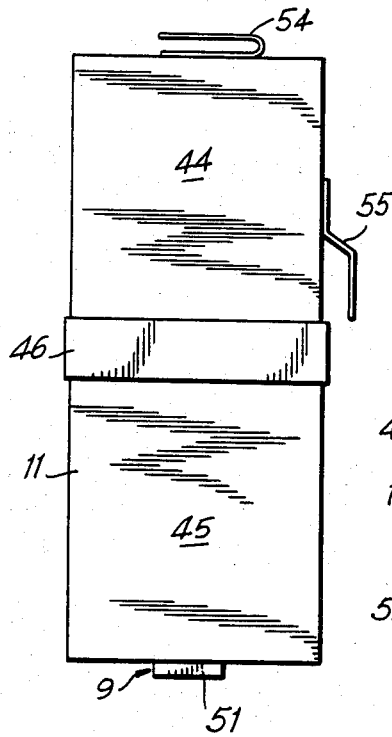
FIG. 3 is a side view of an energiser and battery housing for use with the reel of FIG. 1.
Figure 4:
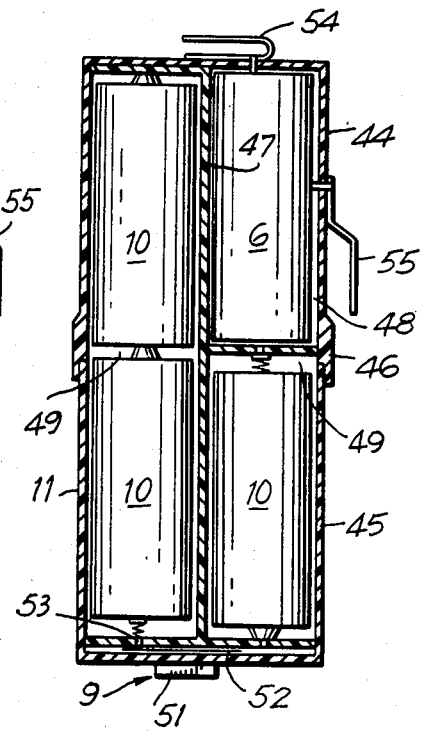
FIG. 4 is a cross-section of the housing of FIG. 3.
Figure 5:
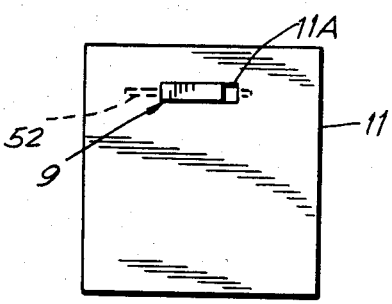
FIG. 5 is an end view of the housing of FIG. 3.

FIGS. 3, 4, and 5 of the drawings illustrate the housing 11 adapted to accomodate a series of batteries 10 as well as an electric fence energiser device 6.

The housing is of a rectangular square configuration, and conveniently is molded in plastics in two half sections 44,45 split about central flange 46. The interior of the housing 11 is compartmentalised by a frame 47, also molded in plastics, to provide one compartment 48 for the energiser device 6, and a number of compartments 49 for batteries 10. A switching device generally indicated by arrow 9 is disposed at one end of the housing 11 and is used to complete a circuit to the energiser.

Switch 9 includes a knob 51 slidable in a slot 11A in the base of the housing 11, and a slidable contact member 52 which is arranged to complete a connection between contacts 53 of the batteries 10 when the energiser is in use, or, to break the connection when the energiser is not being used.

The housing 11 is provided with a grounding contact 54 for the energiser and a power output contact 55 for the energiser.

Figure 2:
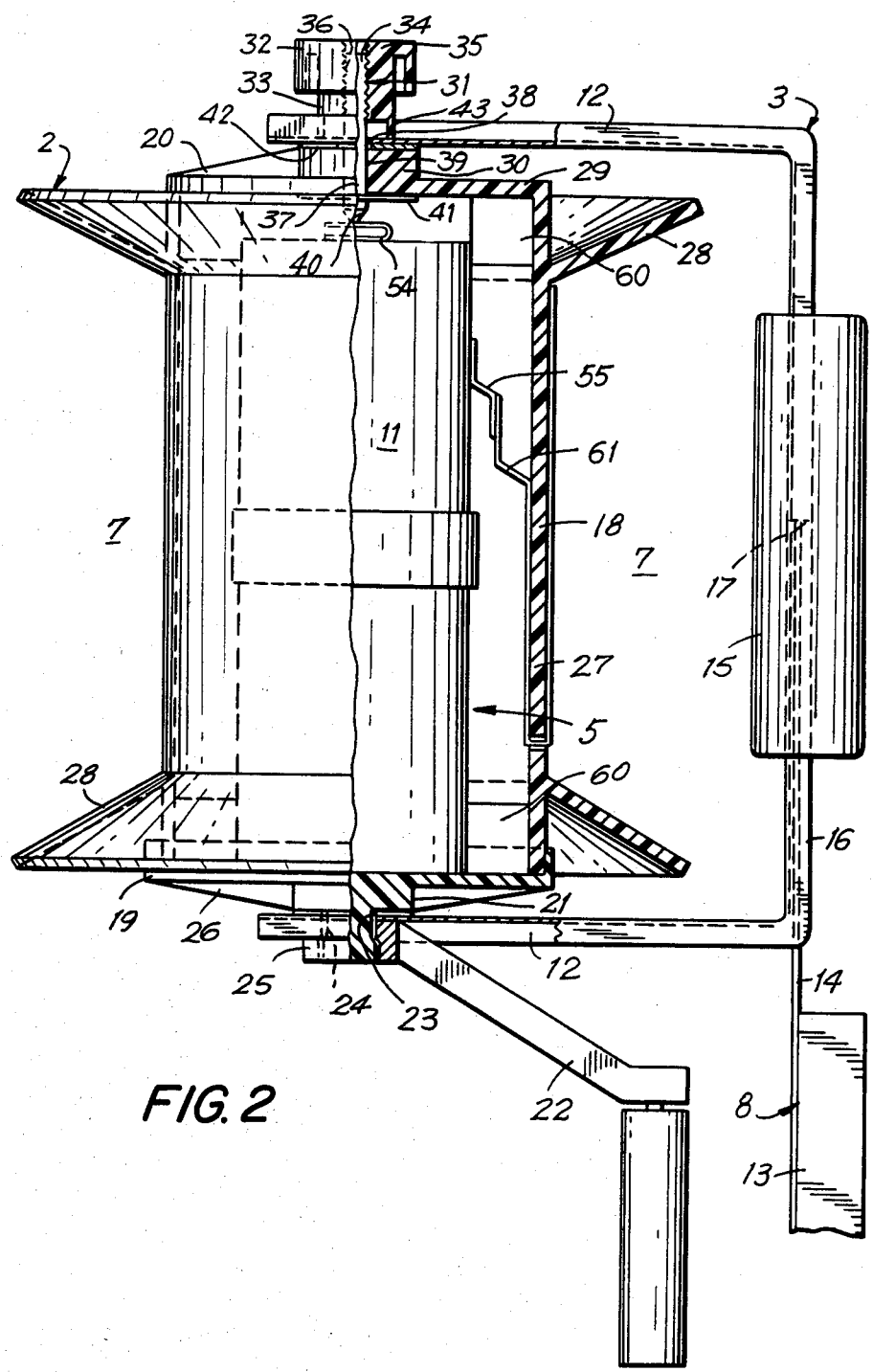
FIG. 2 is a partial sectional view of the reel and support means of FIG. 1.

When the housing 11 is assembled with its components and is placed within the hub 2 (FIG. 2) it is held positioned by locating ribs 60 extending from the inner walls of the cylinder 18. On such assembly the grounding contact 54 is positioned to make contact with the lower end 40 of the pin 34, and the power contact 55 is positioned to contact with a wire contact 61 which extends in a loop to the outside of a cylinder 18 within the wire storage region 7, where electric fence wire for the reel is connected thereto.

When the electric system is to be used, the grounding member 8 is driven into the ground and fence standards 62 are set up, as illustrated by FIG. 1. Fence wire 4 from the reel 2 is then paid out and engaged with the fence standards 62.

The switch 49 is then used to establish the power supply to the energiser. The energiser is earthed via the contact pin 40, the support means 3, and the grounding stake 8.

The energiser 6 may be of the capacitor discharge type, which is arranged to give high voltage pulses to the fence wire 4, separated by approximately one second. Typically such a device will comprise a dc to dc invertor, an energy storage device, an impulse switching circuit and a stepup output transformer. Such components can be mounted on a printed circuit board, which is readily replaceable in the unit with appropriate connections being made to connectors 54, 55. The energiser device is preferably self contained within compartment 48, and only releasable therefrom by the use of a special key or tool (not shown).

Aspects of the present invention have been described by way of example only and it will be appreciated that modifications and additions thereto may be made without departing from the scope of the invention as defined in the appended claims.

What we claim is:

1. An electric fencing device of the type including a hub for the storage of fence wire, support means in which the hub is rotatably supported, an electric fence energizer and a power source located within said hub for supplying electric current to said fence wire, and a grounding member for connecting the energizer to ground, the improvement comprising:

said hub being formed from an electrical insulating material;

said support means being formed from an electrically conductive material and having spaced arms between which said hub is journalled for rotation, one axial end of said hub being rotatably supported in one of said arms; and, a contact member carried by and in electrical continuity with the other of said arms, said contact member extending axially through the opposite axial end of said hub and supporting said opposite end for rotation relative to the other said arm;

said contact member extending axially into direct contact with a grounding contact of said energizer and providing a pivotal contact between said electrically conductive support means and said grounding member of said energizer.

2. An electric fencing device as claimed in claim 1 wherein said contact member passes through one end portion of the reel, and a handle is connected to the opposite end portion of the reel.

3. An electric fencing device as claimed in claim 1 wherein said power source includes at least one battery for supplying electric power to said energiser.

4. An electric fencing device as claimed in claim 1 wherein said grounding member comprises a combination of said support means and a ground stake.

5. An electric fencing device as claimed in claim 1 wherein said support means comprises a substantially U-shaped member having arms in which the reel is supported for rotation about its longitudinal axis.

6. An electric fencing device as claimed in claim 1 wherein the reel is a hollow tubular member, and is arranged to accommodate a separate compartmentalized energizer and power source device having external contact members for connection to said fence wire and to said contact member.

* * * * *